United States Patent [19]
Huessy

[11] 3,971,859
[45] July 27, 1976

[54] TECHNIQUE FOR PREPARING EDIBLE FOOD FLAVOR PELLETS

[75] Inventor: Eric G. Huessy, Eden Prairie, Minn.

[73] Assignee: Peavey Company, Minneapolis, Minn.

[22] Filed: July 9, 1974

[21] Appl. No.: 486,813

Related U.S. Application Data

[63] Continuation of Ser. No. 225,602, Feb. 11, 1972, abandoned.

[52] U.S. Cl................................ 426/618; 426/629; 426/650; 426/653
[51] Int. Cl.²............................................ A23L 1/22
[58] Field of Search ........... 426/147, 199, 363, 618, 426/629, 650, 653

[56] References Cited
UNITED STATES PATENTS 3,434,843  3/1969  Durst .............................. 426/363 X
3,857,977  12/1974  Huessey .......................... 426/199 X

*Primary Examiner*—Joseph M. Golian
*Attorney, Agent, or Firm*—Orrin M. Haugen

[57] ABSTRACT

A method for preparing edible food flavoring pellets for incorporation in dry baking mixes or the like wherein the edible flavoring pellets have a substantial protein content and a reasonably high moisture content. The method includes the preparation of a homogeneous mixture of the selected formulation, forming integral pellets of the mixture, with the pellets thereafter being immersed in heated vegetable oil, preferably peanut oil for a predetermined immersion time. The thus treated material may thereafter be coated with a desirable coating formulation to provide the finished product.

3 Claims, No Drawings

TECHNIQUE FOR PREPARING EDIBLE FOOD FLAVOR PELLETS

This is a continuation of application Ser. No. 225,602 filed Feb. 11, 1972 and now abandoned.

BACKGROUND OF THE INVENTION

The present invention relates generally to a method for preparing edible food flavoring pellets, and more particularly to a method for preparing such pellets having a formulation high in protein. Food flavoring pellets, particularly edible food flavoring pellets have traditionally been prepared by techniques utilizing relatively high quantities of flavoring in the formulations. However, the present concept provides for a method of preparing such edible food flavoring pellets utilizing only a modest or scant amount of flavoring in the formulation, with a substantial portion of the flavoring being derived from the preparation technique. The technique provides homogeneous mixtures of components with enhanced flavoring characteristics, since the exposure to elevated temperatures is held to an absolute minimum, thereby preserving the character and quality of the flavoring ingredients including vitamins, such as Vitamins C and E.

In the past, it has been normal practice to utilize cooking or baking vessels for the preparation of formulations for high protein edible food flavoring pellets. These vessels will normally retain the charge of material at a relatively high temperature for an extended period of time, thereby causing deterioration of the flavoring or nutritional ingredients. In addition, the flavoring ingredient may become fugitive in such a process, and thus inconsistencies in flavor, from batch to batch, may reasonably be expected to occur. The concept of the present invention provides a technique for preparing such formulations with a high degree of product consistency, quality, and character.

SUMMARY OF THE INVENTION

The edible food flavoring pellets prepared in accordance with the present invention find utility in combination with dry bakery mixes, such as cake mixes, muffin mixes, and the like.

The compositions of the present invention preferably contain a primary or base substance rich in protein, including wheat germ and soy flour, with these ingredients being supplemented with a quantity of sugar. Vegetable oil, cornstarch, flavoring and sorbitol are also included, along with salt and preservatives. Preferably, a modest quantity of Xanthan gum, a hydrocolloid is present. Xanthan gum is a high molecular weight linear polysaccharide which functions as a hydrophilic colloid to stabilize the formulations. Essentially, Xanthan gum is classified as a carbohydrate, being aa complex polysaccharide with a molecular weight of more than 1 million. The linear structure includes a beta-linked backbone containing d-glucose, d-mannose and d-glucuronic acid with 1 d-mannose side-chain unit for every 8 sugar residues and 1 d-glucose side-chain residue for every 16 sugar residues. The polysaccharide making up Xanthan gum is partially acetylated and contains pyruvic acid attached to the glucose side-chain residue. The molar ratio of d-glucose to d-mannose to d-glucuronic acid of Xanthan gum is 2.8:3.0:2.0. Xanthan gum is a preferred hydrocolloid because of its tolerance to relatively wide ranges of pH in the systems.

The incorporation of Xanthan gum in the dry formulation further assists in the later extrusion operation, the Xanthan gum functioning as a lubricating agent, lubricating the mechanism while in combination with water, and while retaining water with adverse conditions of elevated temperatures. It has been found that modified hydrocolloids may be employed, such as alginates, carboxy-methyl-cellulose, or certain other natural occurring gums.

The edible food flavoring pellets prepared pursuant to the present invention may be provided with coatings of desired formulation. Such coatings may, for example, be of a cornstarch base in order to protect the integral character of the finished product, and also to provide additional control to the possible "bleeding" of the food flavoring pellet in the event controlled bleeding is desired. The incorporation of the Xanthan gum hydrocolloid assists in controlling the character of the dye and its ultimate dispersing in the product during the baking cycle. As such, these edible food flavoring pellets may form a basis for artificial components of flavor such as, for example, pecans, blueberries, or the like.

Sorbitol is preferably employed in the formulation, this component functioning as a humectant. The sorbitol employed is also one which provides a sweet taste for the finished product.

The edible food flavoring pellets prepared in accordance with the present invention have a relatively long shelf life and normally will not deteriorate or become soft, sticky, or runny under modern packaging techniques. The food flavoring pellets retain their characteristic texture and flavor over extended periods of time, and will not deteriorate under normal environmental conditions.

Essentially, in accordance with the present invention, a formulation is initially prepared having a relatively high protein content and a high water content such as in excess of about 8 percent. This formulation is prepared, mixed homogeneously, and initially maintained with a low or modest water content. Following formulation, the mixture is then treated so as to form integral parts of the homogeneous composition, these pellets either being formed by an extruder utilizing a cut-off mechanism or agglomeration. If extruded, the formulation is preferably heated to a temperature of between 100° and 200°F. to maintain appropriate viscosity, with a modest quantity of water having been added to the mixture prior to the extrusion. It will be appreciated, of course, that conventional agglomeration techniques may also be employed with routine tumblers or the like being utilized. The pelletized material is thereafter immersed in a heated vegetable oil preferably peanut oil and with the peanut oil being maintained at a temperature of between about 350° and 400°F., the material is immersed for a period of between about 30 seconds and 100 seconds.

This treatment provides a finished product having a flavor which is consistent, and preserved throughout the processing, with a substantial portion of the flavoring being derived from the hot oil immersion operation.

Therefore, it is a primary object of the present invention to provide an improved technique for the preparation of edible food flavoring pellets, with these pellets having desirable, predetermined, and repeatable characteristics of flavoring texture.

Therefore, it is a primary object of the present invention to provide an improved technique for the preparation of edible food flavoring pellets from formulations having high protein content and relatively high moisture content, wherein the formulation is immersed in a vegetable oil at high temperatures for a controlled period of time, with desired characteristics and uniformity of flavor and texture being retained in the pellets.

It is a further object of the present invention to provide an improved technique for the preparation of nut-flavored edible food flavoring pellets having a high protein base and modest to high moisture content, and wherein the formulation is subjected to immersion in hot peanut oil.

It is yet a further object of the present invention to provide a method of preparing edible food flavoring pellets from a formulation which contains a quantity of sorbitol and Xanthan gum for controlling the moisture retention in the product while being subjected to exposure to elevated temperatures.

It is yet a further object of the present invention to provide an improved technique for the preparation of edible food flavoring pellets of high protein content and modest moisture content wherein the pellets are prepared pursuant to a technique including immersion in hot peanut oil, and wherein the finished product is coated with a layer of a coating formulation which is high in cornstarch content, and which protects the integral nature of the flavoring pellets to permit dispersion into dry baking mixes such as cake mixes and muffin mixes.

Other and further objects of the present invention will become apparent to those skilled in the art upon a study of the following specification and appended claims.

DESCRIPTION OF THE PREFERRED EMBODIMENT

For conducting the various operations pursuant to the present invention, a formulation having the following composition was prepared:

EXAMPLE 1

| Ingredient | Percentage |
| --- | --- |
| Wheat germ | 40.49 |
| Soy flour | 20.24 |
| Sugar | 13.97 |
| Water | 8.92 |
| Vegetable oil | 5.06 |
| Cornstarch | 4.01 |
| Artificial flavor | 2.45 |
| Sorbitol | 2.23 |
| Sodium chloride | 1.90 |
| Lactic acid | 0.45 |
| Sodium citrate | 0.22 |
| Xanthan gum | 0.07 |

The dry ingredients are thoroughly mixed until homogeneous. Thereafter, the liquid components are added and thoroughly mixed until homogeneous.

For pellet preparation, the formulation is placed into the auger chamber of an extruder, with the die being provided with a cut-off blade. The auger chamber is preferably heated to a temperature of between 100° and 200°F., however if the higher temperature range is utilized, care must be taken to control the water content of the product, since a certain quantity may be flashed off at the die.

The viscosity of the product assures elevated pressures within the auger chamber, such as in the range of about 500 psi.

A heated auger may be employed in order to achieve the desired temperature range durng mixing, heated chambers of this type being, of course, commercially available.

If desired, a conventional tumbler can be utilized to form an agglomeration of the raw material to form the pellet. Such agglomeration tumblers are also, of course, commercially available.

After forming the individual pellets, they are immersed in peanut oil heated to a temperature of 380°F. for a period of 60 seconds. The immersion in the hot peanut oil changes both the texture and the flavor of the raw wheat germ, and contributes to the nut-flavor of the finished product. In addition, the treatment in the heated oil provides crisp texture throughout the entire pellet body.

A coating may be applied to the pellets following treatment in the hot oil, this coating having a formulation as follows:

EXAMPLE 2

| Ingredient | Percentage |
| --- | --- |
| Sugar | 87 |
| FD&C color | 1 |
| Powder flavor | 3 |
| Salt | 5 |
| Citric acid | 2 |
| Vegetable oil | 2 |

The pellets and the coating are tumbled together with a quantity of vegetable oil, the vegetable oil constituting between 1 and 2 percent by weight of the pellets.

The following general formulations have been found useful:

| Ingredient | Percentage |
| --- | --- |
| Hydrolysates (sugar, dextrose solids, or derivatives) | 90 |
| FD&C color | 1 |
| Powder flavor | 2–4 |
| Salt or other buffers | 3–6 |
| Acids (citric, lactic, acetic, phosphoric or ascorbic, including mixtures thereof, such as acetic/ascorbic acid mixtures) | 1–2 |
| Vegetable oil | 2 |

The function of the coating is to assist in tailoring the product to the desired end use. The coating may provide a controlled balance between hydrophilic and hydrophobic properties. Additionally, a coating may be utilized to carry a dye and control the solubility of the dye. Coatings may also be utilized to carry both color and flavor, as may be desired.

EXAMPLE 3

| Ingredient | Percentage |
| --- | --- |
| Wheat germ | 30.37 |
| Soy flour | 30.37 |
| Sugar | 13.97 |
| Water | 8.92 |
| Vegetable oil | 5.06 |
| Cornstarch | 4.01 |
| Artificial flavor | 2.45 |
| Sorbitol | 2.23 |
| Sodium chloride | 1.90 |
| Lactic acid | 0.45 |

| Ingredient | Percentage |
| --- | --- |
| Sodium citrate | 0.22 |
| Xanthan gum | 0.07 |

This composition provides a base ingredient for substantially the same purposes as that set forth in Example 1, however it is somewhat richer in soy flour.

Wheat germ is present in an amount from 30% to 50% and soy flour from 10% to 30%. It has been found that the ratio of wheat germ to soy flour may range from between 2:1 and 1:2, depending upon the end result desired in the product. Sugar is present in the formulation in a percentage of from 10 percent to 15 percent.

It has also been found that the wheat germ-soy flour combination may be supplemented with certain binders, if desired. A binder may assist in preparation of the individual pellets, particularly when these pellets are formed by extrusion.

Turning now to the individual components and their function in the system, the wheat germ and soy flour provide the basic bulk for the system, with the treatment of these components in hot peanut oil providing nut-like flavor and texture.

Sugar is present in an amount from 10% to 15%, sugar and other carbohydrates present in only modest quantities, provide some bulk for the product, but also provide flavor.

The vegetable oil is present in an amount from 4% to 6% and is utilized to assist in providing lubrication for the system during the extrusion operation, but also provides for proper consistency in the overall finished product.

The cornstarch is present in an amount from 3% to 5% and is utilized as a filler and lightener, and in this composition is included in a range of about 4 percent. Normally, the quantity will depend on the color of the end product, with the specific range being determined in part by the overall starch content. Lower quantities of cornstarch tend to permit the material to become darker in color.

The artificial flavoring, varying from 1–5%, is employed to match the taste characteristics to that desired in the finished product, with lactic acid and sodium citrate being present for taste purposes as well.

Salt, sodium chloride, is also present to assist in the taste characteristics for the finished product.

Sorbitol and Xanthan gum are added for purposes of providing proper humectant properties to the product. Sorbitol, while present in an amount ranging up to about 2.23 percent, may be useful in quantities as low as about 1 percent, and as high as about 3 percent. The Xanthan gum, a commercially available product, may be employed in a composition ranging from between about 0.05 percent and about 0.1 percent with some formulations containing from between 0.03 percent to 0.6 percent. The combination of sorbitol and Xanthan gum provide a proper balance for the approximately 9 percent water content for the mixture, and also assist in the extrusion operation. Water contents of from 7 percent to 11 percent are employed.

While vegetable oil is normally preferred, it has been found that mineral oil may be employed for producing the lubrication function. Normally, however, vegetable oil is preferred over mineral oil, particularly in high protein base flavoring pellets. Vegetable oil is present in the formulation in an amount of from 4 percent to 6 percent. Cornstarch is present in the formulation in amounts ranging from 3 percent to 5 percent.

It will be appreciated that both water and oil dispersible dyes are available, and may be used depending upon the net affect to be obtained with the product. The degree of dispersion of the material may also be a factor which is desired to be controlled in the finished product. For example, if it is desired to "set" a dye in a certain medium, the opposite phase is employed in order to set the dye in the medium employed. For example, an acid-set dye, soluble in neutral or alkaline phase, is used in an acid medium in order to rapidly set the dye in the acid phase. This control may be employed in order to regulate the degree of bleeding of the dye in the product to be employed. Normally, only a modest amount of bleeding of the dye is anticipated in protein base flavor pellets.

The various formulations set forth are, of course, set forth for purposes of illustration and certain modifications may be made from the formulations while practicing the features of the present invention.

I claim:

1. The method of preparing edible food flavoring pellets for incorporation in dry baking mixes and the like which comprises:

a. preparing a homogeneous protein rich mixture with the following formulation:

| Ingredient | Percentage |
| --- | --- |
| Wheat germ | 30 – 50 |
| Soy flour | 10 – 30 |
| Sugar | 10 – 15 |
| Water | 7 – 11 |
| Vegetable oil | 4 – 6 |
| Cornstarch | 3 – 5 |
| Sorbitol | 1 – 3 |
| Artificial flavoring | 1 – 5 |
| Sodium chloride | 1.90 |
| Lactic acid | 0.45 |
| Sodium citrate | 0.22 | b. separating said formulation into integral pellets; and c. immersing said integral pellets into a bath of vegetable oil heated to a temperature of between 350° and 400°F. for a period of between about 30 seconds and 100 seconds.

2. The method as set forth in claim 1 being particularly characterized in that said protein rich mixture contains between about 0.03 and 0.6 percent Xanthan gum.

3. The method as set forth in claim 1 being particularly characterized in that sodium chloride is present in a quantity of 1.9 percent; lactic acid 0.45 percent; sodium citrate 0.22 percent; and Xanthan gum from between 0.05 percent and 0.1 percent.

* * * * *